April 20, 1937.  W. W. WISHART  2,077,974
AIR CONDITIONING APPARATUS
Filed June 2, 1933  3 Sheets-Sheet 1

Inventor:
William W. Wishart
By:- Cox & Moore attys

April 20, 1937.  W. W. WISHART  2,077,974
AIR CONDITIONING APPARATUS
Filed June 2, 1933   3 Sheets-Sheet 2

Inventor:
William W. Wishart
By:- Cox & Moore
attys.

April 20, 1937.  W. W. WISHART  2,077,974

AIR CONDITIONING APPARATUS

Filed June 2, 1933  3 Sheets-Sheet 3

Inventor:
William W. Wishart
By:- Cox & Moore
attys.

UNITED STATES PATENT OFFICE 2,077,974

AIR CONDITIONING APPARATUS

William W. Wishart, Chicago, Ill.

Application June 2, 1933, Serial No. 673,955

19 Claims. (Cl. 257—7)

My invention relates in general to air conditioning and has more particular reference to temperature control of the atmosphere in compartments and more specifically to compartments used for the transportation or storage of perishable materials, the invention relating more especially to the temperature control in railroad refrigerator cars.

An important object of the invention is to provide an air conditioning system powered from a moving part of the vehicle when in transit through a hydraulic drive for maintaining the temperature of a compartment within a desired range during wide fluctuation in outside temperature.

The invention has, for a further object, the provision of power-operated air conditioning devices associated with the compartment and powered from the axle of a car on which the compartment is carried through a hydraulic drive whereby the air-conditioning devices may be actuated irrespective of the direction of travel of the car, the hydraulic drive permitting the air-conditioning devices to be powered from an external power source when the car is stationary without declutching the drive from the axle.

Another object is to use the fluid medium of the hydraulic drive system for operating the heating coils.

Another object is to provide means for operating the heaters of the air-conditioning system by means of fluid pressures developed in the hydraulic drive whether the system is being powered from the axle or from an external source when the car is stationary.

Another object is to provide an automatic temperature control mechanism including refrigeration means powered by a fluid pressure system for maintaining a storage compartment below a predetermined maximum when the outer atmosphere is relatively warm, and alternately operable heating means operated by fluid pressure from the drive system for maintaining the temperature within the compartment above a predetermined minimum when the external atmosphere is relatively cold.

Another object is to provide means for using the refrigerating medium of the cooling system for operating heating coils.

Another important object is to provide a refrigerating apparatus adapted to maintain the atmosphere in the car below a predetermined maximum temperature and co-operatively associated heating means operable to maintain the atmosphere in the car above a predetermined minimum temperature, the refrigerating and heating means being operated by a common circulating medium.

Another object is to provide a hydraulic system for driving the air-conditioning apparatus continuously in one direction by the movement of the car while in transit in either direction.

Another object is to provide a hydraulic drive including a fluid pressure generator or pump which will deliver pressure at a pressure outlet irrespective of the direction in which it is driven.

Another object is to provide a hydraulic drive including a fluid pressure pump and a fluid pressure motor driven by fluid delivered under pressure by said pump and to provide means to utilize the fluid under pressure from the hydraulic drive in order to energize an operable device, and said hydraulic drive having means permitting the motor to be driven as a fluid pressure generator to supply fluid under pressure for operating the device when the fluid pressure pump is inactive.

Another object is to provide a hydraulic drive including a variable speed fluid pressure pump adapted to be driven in either direction, and a fluid pressure motor driven in one direction only and at constant speed by fluid under pressure delivered from said pump.

Another object is to provide a hydraulic drive including a variable speed fluid pressure pump adapted to be driven in either direction, and a fluid pressure motor driven in one direction only and at constant speed by fluid under pressure delivered from said pump, said hydraulic drive having means permitting the motor to be driven as a fluid pressure generator to supply fluid under pressure for operating a separate operable device when the pump is inactive, said operable device being energized by fluid under pressure delivered by the pump when the same is driven.

Another object is to operate the heating system by fluid pressure generated either by the movement of the car or by electrical current from an external power source when the car is stationary.

Another important object resides in providing heating and cooling apparatus for cars, wherein the apparatus is operated and controlled from the moving parts of the car by means of a hydraulic drive.

Another object is to use compressed air as the heating medium.

Another important object is to operate the refrigerator system by means of a fluid pressure motor powered from a fluid pressure generator or pump driven from the axle of the car when the car is in transit and to operate the motor by means of a directly coupled alternator.

Another important object is to provide a temperature control for refrigerator cars including heating means and cooling means operated by hydraulic means from the movable portions of the car in order to maintain the atmosphere of the car between predetermined adjustable maximum and minimum temperatures.

Another object is to provide a hydraulic system including a fluid pressure motor adapted to be driven in one direction under the influence of fluid pressures applied thereto from fluid pressure generator or pump, said motor, when driven, being adapted to develop fluid pressures in the system and said system being arranged to prevent the pump from being affected by the fluid pressures developed by the motor.

Another object is to provide a hydraulic drive including a variable speed fluid pump and a fluid motor driven at constant speed by the fluid pressures developed by the pump.

Another object resides in providing means for selectively powering both the heating and cooling systems from the axle-driven fluid pressure generator when the car is in transit and from an external source of electrical power when the car is stationary.

Another object is to provide for powering the heating and refrigerating means by means of fluid pressures developed from a movable car part while the car is in transit and in utilizing direct electrical current apparatus powered from a moving car part to control the operation of the heating and refrigerating means in order to maintain a substantially constant refrigerating effect at all speeds, and for operating the system by means of alternating current from a commercial power line when the car is stationary.

Numerous other objects and advantages of the invention will be apparent from the following description, which, taken in connection with the accompanying drawings, discloses a preferred embodiment of the invention.

Referring to the drawings.

To illustrate my invention, I have shown on the drawings, a preferably heat insulated casing 11 comprising any suitable type of enclosure having temperature control apparatus embodying my present invention.

The casing 11 preferably comprises the body of a vehicle or car and is mounted on wheels 13, being shown as a railway refrigerator car. The temperature control apparatus preferably includes a system for the circulation of any suitable refrigerating medium, such as ammonia, sulphur dioxide, ethyl chloride, or any other suitable refrigerating medium; the system includes a compressor 15, a condenser 17, cooling coils 19, and cold storage devices 21 located in any suitable or convenient position on or in the casing, there being preferably a coil 19 and a cold storage device 21 behind partitions or bulkheads 12 at each of the opposite ends of the casing 11 although, of course, the coils 19 and the devices 21 may be located on the side walls or roof of the casing, or in any other suitable position if desired. The bulkheads preferably separate the casing into chambers 14 at the opposed ends of the casing and an intermediate compartment 16. The bulkheads preferably have openings 18 near the floor and near the ceiling of the casing to facilitate the circulation of air between the compartment 16 and the chambers 14 containing the cooling devices 19 and 21. The system also includes suitable piping or conduits 23 for connecting the compressor, condenser, and cooling devices 19 and 21 in a circulating system.

The coils 19 and the devices 21 at the opposite ends of the compartment are arranged for parallel operation and a temperature regulated control valve 25 is provided to direct the flow of the refrigerating medium either to the refrigerating coils 19, or to the cold storage devices 21.

The refrigerating medium is circulated in the system from the compressor 15 through a pressure-limit switch 27, an oil interceptor 29, and the coils 31 of the condenser, thence through an expansion valve 24 and the control valve 25, thence either through the parallel circuits 33, including the coils 19 at opposite ends of the storage compartment, or through the parallel circuits 35 through the cold storage devices 21 at opposite ends of the compartment and finally back through the common return conduit 37 to the inlet of the compressor 15.

Figure 1:
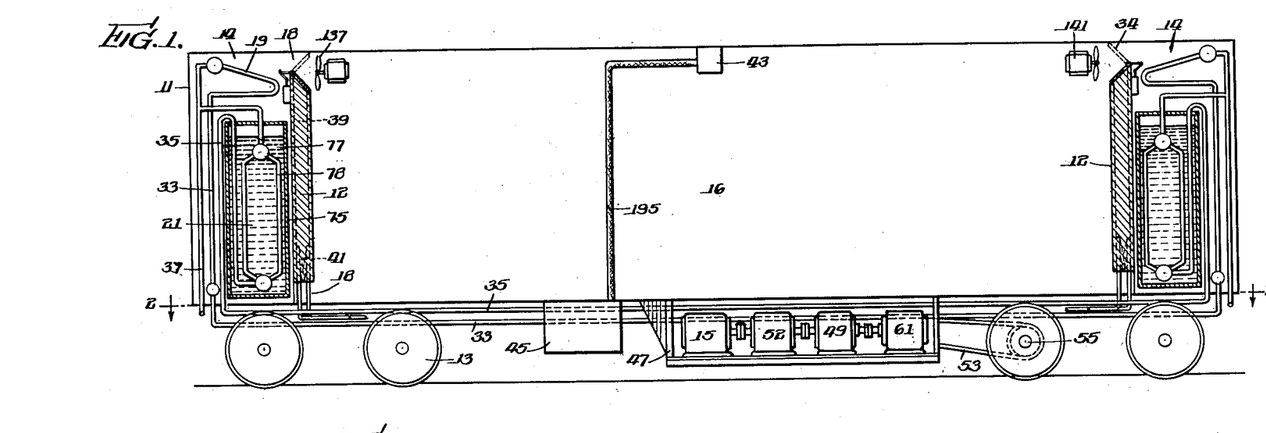
Figure 1 is a sectional view taken longitudinally through a railroad refrigerator car to illustrate a preferred embodiment of my invention.
Figure 2:
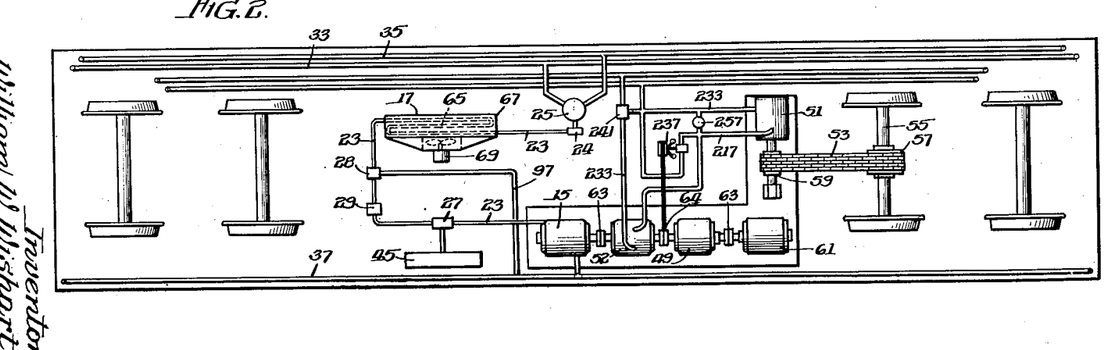
Figure 2 is a sectional view taken substantially along the line 2—2 in Figure 1.

The temperature control apparatus includes blowers 137 for circulating the air in the car, said blowers, as shown in Figure 1 of the drawings, being preferably located at opposite ends of the car with their intakes near the ceiling of the compartment 16, and arranged to direct currents of air downwardly through the conduits 39, the discharge ends of which are located adjacent the floor of the car and provided with heating elements 41. The control apparatus also includes thermostatically operated devices preferably located within the car in any suitable or convenient position. These devices, as shown in Figure 1 of the drawings, are carried on a suitable support 43 preferably mounted on the ceiling of the compartment 16.

Suitable connections also are provided whereby the thermostatically operated devices may selectively control the operation of the cooling coils 19, the cold storage devices 21, the blowers 137, and the heating elements 41. This control apparatus preferably comprises electrical circuits and circuit-switching means conveniently located in a control cabinet 45 preferably carried in easily accessible position on the underside of the car bottom.

Means is also provided for powering the refrigerating system, the blowers, and the heating elements from one of the car axles or alternatively from an external source of power. The compressor 15, which may be of any preferred form and type, is preferably supported in readily accessible position on a suitable frame 47 mounted beneath the central portions of the car, the frame being of open construction in order to permit air to circulate around the compressor in order to cool the same. The compressor is drivingly connected with a fluid-pressure operated motor 52, which, in turn, is provided with suitable hydraulic connections for deriving operating power from a variable-speed, fluid pressure generator or pump 51, the motor 52 being carried in the frame 47 with the compressor, and the generator 51 being located in any suitable or convenient position beneath the car body and drivingly connected as by means of the belt or chain 53 with a car axle 55. The driving element 53 preferably operates over suitable pulleys or sprockets 57 and 59 mounted respectively on the car axle and on the shaft of the generator; and the driving elements, 53, 57, and 59 are preferably so arranged that the pulley 57 may swing out of alignment with the pulley 59 when the car is traveling a curved path without interfering with the driving connection. Of course, any suitable equivalent driving device, such as an extensible shaft provided with universal joints and operatively geared at its opposite ends to suitable gears on the axle and on the generator may be used. Alternatively, the generator may be mounted directly on the truck or bogie, which carries the axle 55, and may be either drivingly connected with the axle by mechanical means, or may be built onto the axle itself, in which case the generator swings with the axle and no provision need be made for the relative displacement of the axle with respect to the generator while the car is traveling a curved path. With such an arrangement, however, flexible pipe connections from the pressure generator 51 to the motor 52 are necessarily provided. In any event, the movement of the car, in transit, through its axle drives the generator 51 and produces fluid pressure for driving the motor 52 at constant speed no matter how fast or which way the car may be travelling, as will hereinafter be more fully explained.

Means is also provided for driving the compressor from an external power source when the car is stationary. For this purpose, I prefer to utilize an alternating current motor 61, although other forms of motive devices may, of course, be employed if desired. The compressor, motor 52, a direct-current generator 49, and the alternating-current motor 61 preferably have their shafts directly coupled together as shown at 63, although, of course, if a direct coupling between the compressor and the motors 49 and 61 cannot be conveniently accomplished, I may employ a geared, belted, or cranked connection for driving the compressor. Thus a suitable connection is provided whereby the alternating current motor may be electrically connected in a readily detachable manner with a source of external power in order to drive the compressor and thus operate the refrigerating system, drive the motor 52 and drive the direct-current generator 49 when the car is stationary.

If desired, the generator 49 and the motor 61 may be built as a unit as by providing an ordinary repulsion induction motor with a commutator and brushes to connect the rotor for direct-current operation. Such a device can be driven as an alternating current motor-direct current generator by connecting the induction motor leads to a suitable alternating-current source. However, the effect is accomplished, the motor-generator set 49, 61 provides for operating the system by alternating-current when the car is stationary, the system being operated by the fluid-pressure drive when the car is in transit. In either event, the operation of the system is controlled, at least, in part by direct current produced by the generator 49, which is driven by the motor 52 while the car is in motion, or by the motor generator combination 49, 61 when the car is stationary.

The cooling system

The condenser 17 is preferably mounted on the outside of the car body in position exposed to the external air in order to promote the dispatch of heat therefrom. However, the condenser may be located in any convenient position on the underside of the car body, the condenser being of compact construction so that it may be mounted adjacent the compressor. The condenser comprises one or more coils of pipe 65 provided with extended heat-radiating fins or other heat-transferring surfaces and is mounted within a suitable housing 67 through which a natural circulation of air may be maintained by the travel of the vehicle and through which an artificial circulation may be promoted, as by means of the fan 69 in order to efficiently and rapidly cool and liquefy the refrigerating medium compressed in gaseous form in the compressor and delivered thereby, through the limit switch 27 and the oil interceptor 29, to the condenser. The fan 69 is preferably electrically driven and suitable, preferably permanent, connections are provided for supplying the same with power from the generator 49, in which case the fan 69 operates at all times. Alternately, the fan motor connections may be provided with a switch to operate the fan only when insufficient air is circulating in the condenser to properly cool and liquefy the refrigerant as may occur when the car is stationary.

The oil interceptor 29 is positioned in the conduit 23 connecting the compressor discharge with the condenser inlet. The limit switch 27 is also located in this conduit between the compressor and the condenser. The oil interceptor 29 may be of any suitable or preferred form for the purpose of removing oil carried in suspension by the compressed refrigerating medium as forced from the compressor and thus eliminate troubles which may be caused in the condenser and other portions of the circulating system by traces of oil carried by the circulating medium. From the condenser, the compressed and cooled refrigerating medium is delivered through an expansion valve 24 and thence to the valve 25, preferably solenoid operated, controlling the distribution of the refrigerant through the parallel circuits 33 to the coils 19, or through the parallel circuits 35 to the coils of the cold storage holdover devices 21. The valve 25 may be of any suitable or preferred form for directing the refrigerant selectively into the circuits 33 or into the circuits 35. When the refrigerant is directed through the circuits 33, the atmosphere in the car will be refrigerated by direct contact with the coils 19. When the atmosphere has thus been cooled below a predetermined temperature, the thermostat devices on the mounting 43, operating through the control circuits hereinafter more completely described, cause the valve 25 to direct the refrigerant into the circuit 35. The refrigerating energy, in excess of that required to maintain the car below the temperature at which the switching from the direct cooling coils occurs, will be stored up in the cold storage devices 21. The stored energy may be liberated to maintain the atmosphere in the car in a substantially cold condition for a considerable interval after the refrigerating apparatus becomes inactive, as when the car may remain stationary for a period without being connected for operation from an external power source.

The solenoid valve 25 is normally arranged when its solenoid is inactive to direct the refrigerant only to the hold-over coils 21 and when the solenoid is energized to deliver the refrigerant only to the direct-cooling coils 19.

When it is desired to discontinue the cooling entirely, a two-way valve 28, preferably solenoid operated, and disposed in the pipe 23 between the compressor and condenser, is actuated to direct the refrigerant through a pipe directly back to the intake side of the compressor so that the flow of refrigerant through the condenser and refrigerating coils is prevented.

The solenoid valve 28 also is adapted, when its solenoid is energized, to direct the refrigerant from the compressor to the condenser and thence to the cooling coils. When the solenoid is inactive, the valve is arranged to by-pass the refrigerant directly from the pressure to the suction side of the compressor through the pipe 97, thus rendering the refrigerating system inactive.

The cold storage devices 21, as illustrated in Figure 1 of the drawings, comprise tanks 75 containing a fluid cold storage or hold-over medium 77, preferably brine, that is to say, a solution of salt or calcium in water. Suitable refrigerant conduits or coils of pipe 78 are immersed in the brine and connected with the refrigerating system. I prefer to use a relatively weak brine solution so that the brine will freeze to a slush when the cold storage devices are in operation as this enables the storage of more refrigerating energy than where the brine has a concentration preventing freezing to a slushy condition when the units 21 are in operation.

The electric drive

As heretofore mentioned, the alternating current motor 61 is directly and permanently coupled both to the compressor 15, the fluid motor 52 and the direct-current generator 49 so that the system may be powered either from the axle through the fluid motor 52, or from an external power source through the motor 61. When the motor 52 is driving the compressor, the motor 61 will rotate in a substantially idle condition.

The motor is preferably of the squirrel cage type having a rotor 87 and stationary windings 89 of any suitable form for causing the rotor to turn when alternating current is applied to the stationary windings.

In the embodiments illustrated, the windings 89 form a three-phase delta connection to which three-phase alternating current is supplied by means of the conductors 91, which are connected between the windings 89 and a plug-in socket 99 of any suitable form through any suitable electric control device 171 as may be necessary to cause the motor 61 to start when the external power is applied. The plug-in socket 99 may be arranged in any suitable or convenient position on the car frame to facilitate the insertion of a connector plug 173, the contacts of which are connected by means of the conductors 175 through the fuses 177 and the disconnecting switch 179 with an external power source such as a transmission line 181.

The hydraulic drive

An important advantage of my present invention is that the compressor is always driven in the same direction whether the car is stationary or in motion and regardless of the direction of car travel.

Another important advantage is that it is not necessary to declutch or uncouple the axle driving connection when it is desired to operate the conditioning system but I provide a hydraulic drive which operates somewhat in the nature of an over-running clutch but which permits the axle to drive the compressor and other driven elements of the conditioning system in one direction only no matter which way the car is traveling and, when the car is stationary, to drive the system from an external power source without manually or otherwise adjusting or declutching the axle drive.

Figure 5:
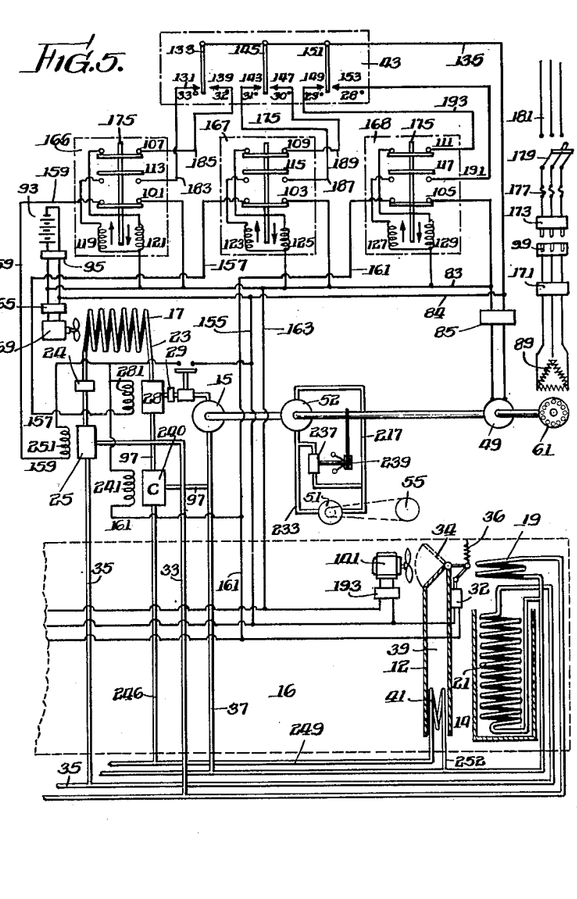
Figure 6:
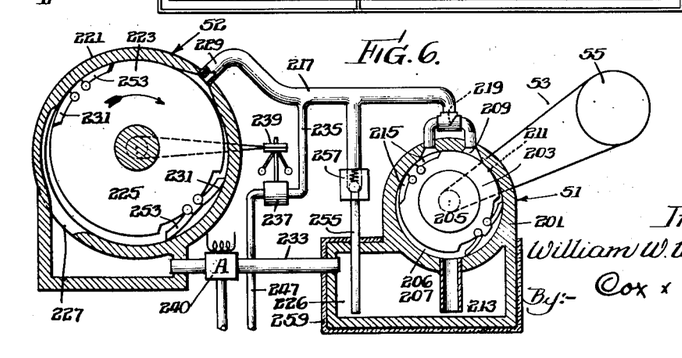
Figure 6 is a sectional view of the hydraulic drive.

In Figure 6 of the drawings, I have shown a preferred form of hydraulic drive system embodying my invention and including the fluid pressure generator or pump 51, the fluid motor 52, and interconnecting conduits. The system is essentially simple, and as shown in Figure 6, includes auxiliary elements whereby the fluid motor may itself operate as a pump when driven by the motor 61, when the car is stationary, as is necessary in the arrangement shown in Figure 3, which contemplates the operation of the heaters 41 by fluid circulated from the hydraulic driving system. These auxiliary elements are not needed in the arrangement shown in Figure 4, wherein the heaters are operated by the circulation of uncondensed refrigerating medium drawn from the refrigerating system. The auxiliary elements also are not required in the arrangment shown in Figure 5, wherein heating is accomplished by means of compressed air provided by an auxiliary compressor 54 drivingly connected to the motor 52 and the motor 61.

The hydraulic drive system includes the fluid-pressure pump 51 of any suitable or preferred construction comprising, in the illustrated embodiment a casing 201 having a central circular chamber 203 in which is rotatably mounted a circular impeller 205 of diameter slightly less than that of the chamber 203. The impeller is carried on a shaft suitably journalled in bearings formed in the sides of the casing. The impeller is mounted eccentrically in the chamber so that on one side it barely clears the circular side of the chamber leaving an appreciable space 206 between the impeller and the casing on the other side. The casing has an inlet 207 preferably opposite the place of widest spacement between the surface of the impeller and the surrounding casing and outlets 209 are provided on opposite sides of the point where the impeller is in substantial contact with the casing walls. The walls of the casing also are or may be relieved as at 211 in order to insure adequate communication between the outlets and the pumping space 206 between the impeller and the casing walls. The inlet 207 communicates with a reservoir or sump 213 which may be formed as a part of the casing 201 if desired. The impeller also carries fluid-forcing blades 215 arranged in pairs located in diametrically opposed positions on the periphery of the impeller. One pair of the blades faces one peripheral direction, while the other pair faces the opposite direction so that when the impeller is rotated in one direction by the car axle, one pair of blades will force oil from the inlet 207 to one of the outlets, the other blades trailing idly and, when the impeller is driven in the reverse direction, the formerly idle blades will force fluid from the intake to the other outlet 209, while the formerly active blades trail idly. The blades press outwardly against and ride upon the circular walls of the chamber and the member 205 is cut away behind the blades to receive them within its peripheral confines when the blades pass the point of minimum clearance between the member 205 and the chamber walls. Both outlets are connected to a conduit 217, there being a valve 219 in the connection to prevent the fluid discharged from either outlet from being returned to the pump casing through the other.

The fluid motor 52, also comprises a casing 221 having a cylindrical chamber 223 and a cylindrical rotor member 225, rotatably mounted in the chamber with one side barely clearing a side of the chamber leaving a substantial space between the member 225 and the casing at the other side. The member 225 is carried on an axle journaled in the casing ends, which axle is coupled with the compressor 15, the generator 49, and the motor 61. The casing has an outlet 227 preferably near the point of widest spacement between the member 225 and the chamber walls. This outlet is connected to the pump sump 213 by means of the pipe 233. The casing also has an inlet 229 located in the chamber walls on one side of the point where the member 225 is in substantial contact with the casing walls. This inlet is connected with the discharge outlets of the pump 51 by the fluid pressure pipe 217. The member 225 carries blades 231 on its periphery similar to the blades 215 of the pump, said blades facing a peripheral direction contrary to the direction in which it is desired to drive the motor 52. The blades press against the circular chamber walls and the member 225 is cut away to receive the blades within its circumferential confines when they pass the point of minimum clearance between the member 225 and the chamber walls.

When fluid under pressure is delivered at the inlet 229, it exercises pressure against the blades 231 driving the rotor member 225 in a clockwise direction viewing Figure 6 and escapes through the outlet 227 back to the pump 51 through the conduit 233.

In order to regulate the speed at which the motor 52 is driven, I provide a by-pass connection 235 between the pipe 217 and the pipe 233. The connection contains a normally closed valve 237 which is opened, by a speed governor 239 driven from the shaft of the rotor member 225, in order to permit fluid to by-pass the motor 52; that is to say, as the motor speeds up under increased pressure in the pipe 217, due to a higher pump speed, the valve 237 is progressively opened thus maintaining substantially constant pressure at the motor intake 229.

The heating system

I have shown three modes of operating the heating devices 41. In each the operation of the device is controlled by a solenoid operated valve 240, arranged when its solenoid is energized, to place the heaters in operation.

Figure 4:
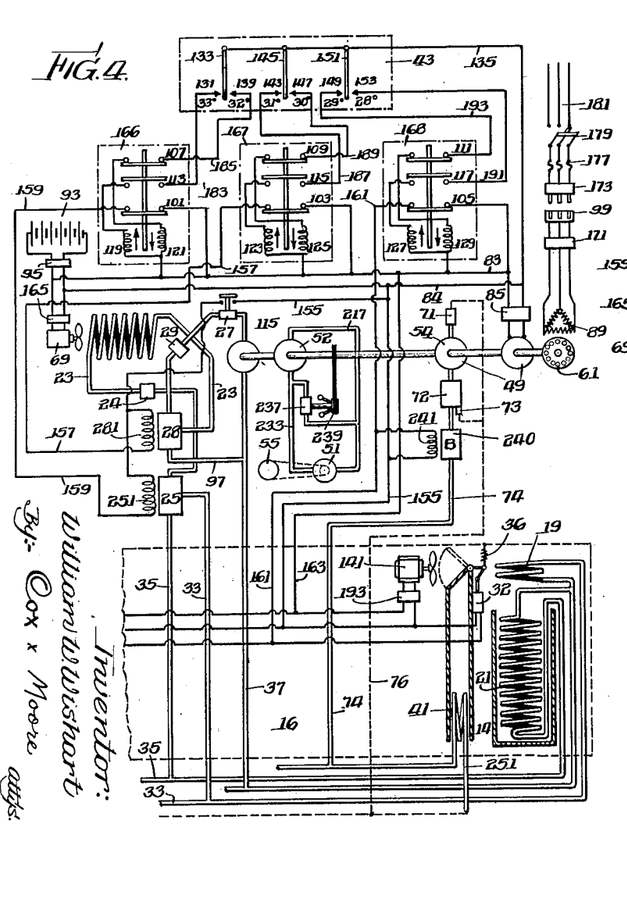
Figures 4 and 5 illustrate modified arrangements embodying the invention.

The hydraulic drive, as above described, is used in each of the arrangements shown in Figures 4 and 5. Additional elements are provided in the hydraulic system used in the arrangement shown in Figure 4, in order to utilize the fluid under pressure in the hydraulic system to operate the heating devices 41. The temperature of the medium is raised during compression. The heating devices comprise coils of pipe having a channel so that the fluid, in traveling through the coils, liberates heat at the coils. The coils also are located at the lower end of the conduits 39 and may be provided with fins to facilitate the heat transfer to the air circulating past the heater coils. The heater channels also may be of restricted size so that additional heat may be generated and liberated at the coils by the passage of the medium under pressure through the restricted channels.

Figure 3:
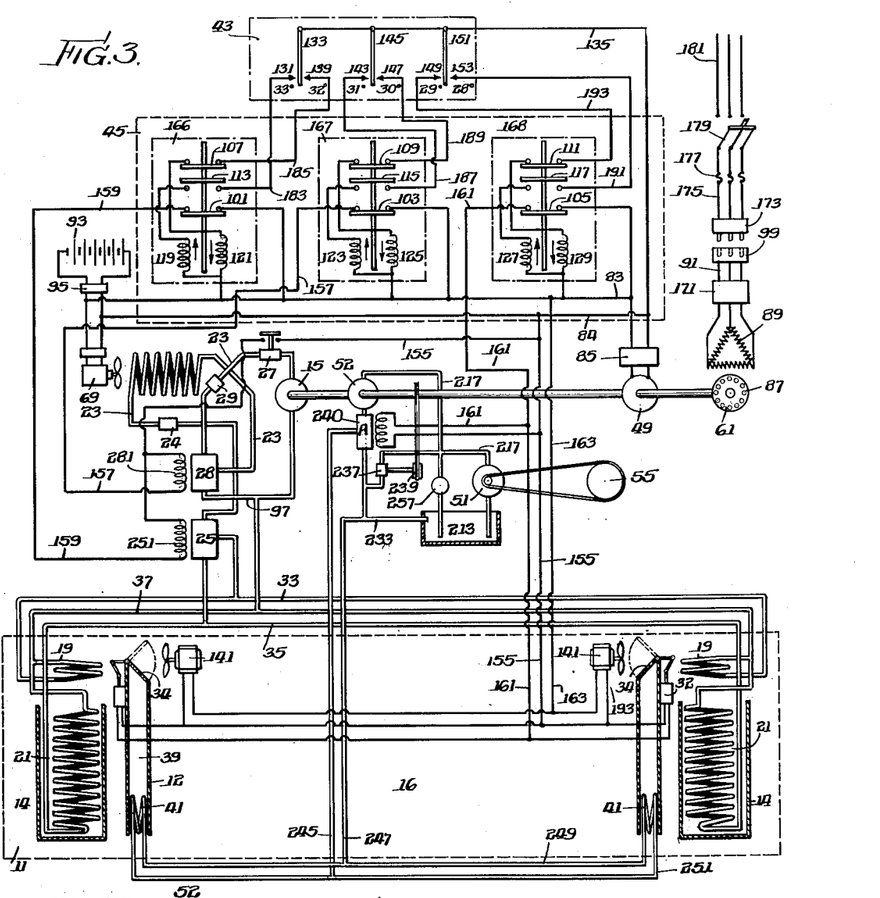
Figure 3 is a diagrammatic representation of the electric connections employed for operating and controlling the temperature regulating system illustrated in Figures 1 and 2.

As shown in Figure 6, discharge pipe 233 is provided, between the outlet 227 and the by-pass connection 235, with a two-way fluid switching valve 240A preferably of the solenoid-operated type. The valve 240A is normally arranged to deliver the fluid discharged at the outlet 227 directly into the pipe 233 leading to the intake side of the pump 51. When the operating solenoid of the valve is energized, however, the valve closes the connection from the outlet 227 to the intake side of the pump and as shown in Figure 3, connects the outlet 227 with a pipe 245, which is connected to the heating coils 41. The heating coils at the opposite ends of the compartment are arranged in parallel and discharge through a common return pipe 247 to the intake side of the pump. When it is desired to operate the heaters, the solenoid of the valve 241 is energized and the fluid medium, discharged by the motor 52, is directed to the heating coils and thence back to the intake side of the pump. When the solenoid of the valve 241 is not energized, the valve 241 assumes its normal position and directs the fluid, discharged from the motor 52, directly back to the pump 51. In this way, the heaters may be selectively operated when the fluid pump 51 is driven. However, in order to provide for operating the heaters while the car is stationary and the pump 51 inactive, the rotor 225 of the motor 52 is provided on its periphery with blades 253 similar to the blades 231. The blades 253, however, extend in a peripheral direction opposite to the blades 231, and serve, when the car is stationary and the rotor 225 is driven by the motor 61, to pump fluid from the inlet opening 229 out through the outlet 227. If the solenoid of the valve 241 is not energized, the fluid so pumped by the motor 61 will be delivered directly into the pipe 233 leading to the intake side of the pump 51. In order to permit the fluid so pumped to by-pass the stationary pump 51, I provide a connection 255 between a sump 226, in the pump intake pipe 233, and the pump discharge pipe 217, said connection being provided with a one-way valve 257 permitting fluid to be drawn from the pump intake pipe 233 and be delivered into the pump discharge pipe 217, without passing through the pump. This will not affect the operation of the pump in any way, since, when the pump 51 is operating and fluid is being delivered under pressure into the discharge pipe 217, the valve 257 will not permit the fluid to by-pass through the connection 255 directly to the pump intake. However, when the pump 51 is stationary and the motor 52 is being driven as a pump, the valve 257 will permit fluid delivered by the motor 52 into the line 233 to return freely to the pipe 217 and thus complete a fluid circulating circuit for the motor. When it is desired to place the heating coils in operation, the solenoid of the valve 240 is energized and the fluid being pumped by the motor 52 through the outlet 227 is directed to the heating coils and thence back to the pipe 233 circulating thence through the by-pass 255 to the intake opening 229. Obviously the invention is not necessarily limited to the specific details of the hydraulic drive illustrated but any equivalent structure may be used.

In Figure 4 of the drawings, the heating devices 41 are operated by means of compressed air supplied from the pressure generator or pump 54 of any suitable construction. Air is drawn into the compressor 54 preferably from the outer atmosphere, through a strainer 71, and compressed air is delivered to a storage chamber or compression tank 72. The compressor 54 and the tank 72 may be mounted on the bottom of the vehicle 11 in any suitable or convenient position facilitating access for inspection or repair.

The tank 72 is provided with a pressure relief valve 73 discharging preferably into the outer air in order to keep the maximum air pressure in the tank within safe operating limits. The tank 72 is connected by means of a pipe 74 to the heating coils 41, which are of restricted diameter and which preferably discharge to the outer atmosphere. If desired, however, return connections 76, shown in dotted lines in Figure 4, may be provided to connect the discharge side of the heating coils 41 with the intake side of the compressor. The pressure relief valve 73 in such case may be arranged to discharge into the return pipe 76. The conduit 74 leading from the compression tank 72 to the heating coils 41 also is provided with a normally closed valve 240B which is preferably solenoid operated. The valve is arranged so that when the solenoid is energized, air may be delivered from the compression tank 72 through the valve for operating the heating devices and when the solenoid is inactive, the valve will prevent delivery of compressed air to the coils 41. The valve 240B thus corresponds with the valve 240A in the arrangement shown in Figure 3 of the drawings. It is of course within the purview of my invention to eliminate the compression tank 72 and to provide a two-way valve similar to the valve 240A in place of the valve 240B, the valve being arranged when its solenoid is inactive to exhaust the air delivered to the valve from the compressor directly to the outer atmosphere or to the return pipe 76, and the valve, when its solenoid is energized, being adapted to deliver air directly from its compressor to the heating coils. The compression tank, however, is desirable as a holdover storage for the heat-creating medium.

I also contemplate the possibility of eliminating the relief valve 73 by forming relief means directly in the compressor. This may be accomplished in a reciprocating compressor by providing means to hold the inlet valve of the compressor open continuously after a predetermined maximum pressure in the compressed air system is reached. With such an arrangement, the compressor merely runs idly drawing cool air into and exhausting the same air through the open intake port without delivering it through the compression port. The cold air thus drawn into and immediately expelled from the compressor through its intake port serves to cool off the compressor when it is not actively delivering compressed air to the heating system.

In Figure 5 of the drawings, I have shown an arrangement whereby the refrigerating medium itself may be utilized to operate the heating system. Obviously, when it is desired to operate the heating system, it is unnecessary to circulate the refrigerating medium through the cooling devices 19 and 21. In fact, as heretofore stated, the refrigerating medium is simply circulated directly from the discharge side to the suction side of the compressor 15 through the by-pass conduit 97 without passing either through the condenser 17 or the coils of the cooling devices. The refrigerating medium traveling the by-pass circuit 97 will be in gasified condition since the refrigerating medium is liquefied only when it passes through the condenser 17. Consequently by arranging a two-way valve 240C in the pipe 97, the refrigerating medium in gaseous condition may be switched either directly to the suction side of the compressor or into a circuit leading to the heating coils, which, in such a case, are arranged to discharge into the return conduit 37 leading to the suction side of the compressor 15. This is the arrangement shown in Figure 5 of the drawings, in which the two-way solenoid valve 240C is arranged, when its solenoid is inactive, to deliver the refrigerating medium directly to the suction side of the compressor and, when the solenoid is energized, to deliver the medium through the heating coils before the same is returned to the suction side of the compressor. The valve 240C, therefore, controls the operation of the heating system in a manner exactly comparable to the functions performed by the valves 240A and 240B in the arrangements shown respectively in Figures 3 and 4.

In each of the heating systems described, the heating effect is produced to some extent by the natural heat in the circulating medium as delivered from the compressor 15, the liquid pump 51 or the motor 52 when driven as a pump, or the air compressor 54.

Under some conditions, the natural heat in the medium may be sufficient to operate the heaters, however, it is within the contemplation of my present invention to increase the heating effect by restricting the bore of the heating coils so that the internal friction of the medium in being forced therethrough will create additional heat, which will be liberated at the heater coils.

I also contemplate the arrangement of heating coils in pairs, one of restricted bore and one of unrestricted character and a valve which may be solenoid-operated and controlled in the same way as are the valves 25, 28, and 240 to normally direct the heating medium to the heaters of unrestricted bore to use the natural heat of the medium for heating purposes, said valve being operable when additional heat is required to deliver the medium through the heater having the restricted bore.

Alternately the conduit leading to the heater coils may be provided with an adjustable orifice and means may be provided to restrict the orifice to thus increase the temperature of the medium passing to the heating devices in order to augment the heat delivered to the heaters. Alternately, the valve 240 may be provided with an adjustable orifice to accomplish the throttling effect.

It may also be desirable to insulate the conduits leading to the heaters to prevent the escape of heat to the outer atmosphere before the medium reaches the heater coils, and to provide insulation 259 for the sump 226 so that the heating medium will not cool off unduly during cold weather and reduce the efficiency of the system.

The temperature control

The control of the temperature conditions in the compartment 16 is accomplished by selectively controlling the operation of the valves 25, 28, and 240. Any suitable thermal responsive mechanism may be utilized to operate these valves but I prefer to employ an electrical system energized preferably by direct current produced by the generator 49. The electrical system is controlled by thermal responsive switches located in the panel 43 and actuates the valves. I have illustrated substantially identical electrical connections for controlling the operation of the several air-conditioning systems illustrated in Figures 3, 4, and 5.

The electrical control system is especially well adapted for air conditioning apparatus used in vehicles more particularly railway refrigerator cars since it provides more positive action and is less susceptible to deterioration and damage than systems employing mechanical or pneumatic control means, although my invention, of course, is not necessarily restricted to air-conditioning systems controlled electrically.

In the electrical control system illustrated, the direct current generator 49 is of any suitable or preferred construction and is adapted to deliver direct current electrical potential between the bus conductors 83 and 84 through a control system 85. A storage battery 93 is or may be connected between the direct-current buses 83 and 84 to act as a power storage and to deliver power to the buses 83 and 84 while the car is stationary and before outside power is applied to the motor 61. When the generator 49 is being driven either from the axle or by the motor 61, it will deliver power to the buses 83 and 84 in excess of that ordinarily required to operate the electrical system. Such excess power may be delivered to the storage battery 93 through suitable protective devices 95 adapted to prevent the battery from becoming over-charged. When the car is stationary and before power from an external source is supplied to drive the motor 61, the storage battery 93 is adapted to deliver the direct current electrical power stored therein to the buses 83 and 84 in order to maintain the system in operation.

It is within the purview of the invention to arrange the control system 85 so that the direct-current generator 49 may operate as a motor receiving driving energy from the storage battery in order to power the heating and cooling systems during the period between stoppage of the vehicle and the application of an external power for driving the motor 61.

The control system 85 also is or may be arranged, when the generator 49 is driven either from the axle or by the motor 61 at a speed lower than required to charge the storage battery 93 or operate the system, to disconnect the generator from the power buses.

The condenser cooling fan motor and the motors 141 of the blowers 137 are preferably connected directly and permanently with the buses 83 and 84 so that they are in continuous operation. I find that it is less expensive to operate the motors 69 and 141 continuously rather than to provide cutout switches to discontinue the motors from service when not actually needed, although cutout switches of this character may be provided if desired. No appreciable efficiency is sacrificed by operating the motors 69 and 141 continuously. The condenser cooling fan motor, however, if desired, may be provided with a switch 165 adapted to place the motor in operation whenever the car is at a standstill or whenever the car is moving at such slow speed that the natural draft created by the movement of the car through the surrounding atmosphere is insufficient to provide adequate circulation.

The operation of the system is controlled from thermostatic means mounted on the support 43 within the compartment 16, the devices to be controlled including the solenoid valves 25 and 28 controlling the operation of the refrigeration system, the valve 240 controlling the heating system, and the shutter-operating solenoids 32 located on the bulkheads 12 near the upper ends of the conduits 39 at opposite ends of the compartment 16. The control circuit of the solenoid 532 in the several arrangements illustrated in Figs. 3, 4, and 5, are connected in parallel with the operating solenoids of the valves 240A, 240B or 240C, which, as heretofore mentioned, control the operation of the heating coils. In other words, the solenoids 32 are energized whenever the operating solenoids of the valves 240 are energized.

The solenoids 32, when energized, are connected to shift shutters 34 to a position directing the air currents, delivered by the blowers 137, through the conduits 39, so that whenever the heating system is placed in operation, the solenoids 32 cause the air circulating in the compartment 16 to travel past the heating devices 41. As soon as the operating solenoid of the valve 240 is de-energized to thus render the heating system inactive, the solenoids 32 are also de-energized permitting the shutters 34 under the influence of biasing springs 36 to assume positions blocking the channels 39 and causing the air circulated by the blowers 137 to travel past the cooling devices 19 and 21.

The operation of the valves 25 and 28, the heat control valve 240 and the shutter control solenoids 32 are effected from the thermo-responsive means carried on the support 43 through switches 101, 103, and 105 controlled by the thermostatic means, the switches in turn controlling the electrical circuits by which power is supplied from the buses 83 and 84 to the operating solenoids of the valves and shutters. The switch 101 controls the operation of the valve 25 and the switch 103 controls the operation of the valve 28, while the switch 105 controls the operation of the heat control valve 240 and the shutter-operating solenoids 32.

It is necessary to energize the operating solenoid of the valve 28 as soon as the temperature within the car exceeds a predetermined temperature, as for instance 31 degrees Fahrenheit, in order to place the refrigerating system in operation to deliver the refrigerating medium through the valve 25 to the cold storage holdover device.

It is further necessary to actuate the valve 25 by energizing its operating solenoid in order to deliver the refrigerating medium to the direct cooling coils 19 as soon as the temperature within the compartment exceeds a predetermined temperature as for instance 33° F.

It is necessary further to de-energize the operating solenoid of the valve 25 to direct the cooling medium to the holdover device when the temperature within the car falls below a predetermined temperature, as for instance 32° Fahrenheit, and, if the temperature continues to fall, to de-energize the operating solenoid of the valve 28 in order to discontinue operation of the refrigerating system entirely when the temperature within the compartment has passed below a predetermined temperature as for instance 30° Fahrenheit.

Furthermore, it is necessary to place the heaters 41 in operation by energizing the operating solenoid of the valve 240 and by energizing the shutter-operating solenoids 32 as soon as the temperature within the compartment 16 falls below a predetermined temperature as for instance 28° Fahrenheit, and, as the temperature rises above a predetermined temperature as for instance 29° Fahrenheit, to de-energize the operating solenoids of the valve 240 and the shutters whereby to discontinue operation of the heating system and to permit the shutters to assume their normal position permitting circulation of the air past the cooling devices.

In order to accomplish this desired sequence of operation, a plurality of control switches are employed. These control switches are arranged in groups 166, 167, and 168. The control switch groups are preferably mounted on separate panels and said groups respectively containing the control switches 101, 103, and 105. Each group also includes additional switches 107, 109, and 111 adapted to open and close respectively with the corresponding control switch 101, 103, or 105 of its group. Switch 107 opens and closes with switch 101, switch 109 opens and closes with switch 103, and switch 111 opens and closes with switch 105. The groups 166, 167, and 168 also respectively contain switches 113, 115, and 117 which are adapted to open when the corresponding control switch of the group is closed. Switch 113 is open when the switch 101 is closed and closed when the switch 101 is open. The switch 115 is open when the switch 103 is closed and closed when the switch 103 is open. The switch 117 is open when the switch 105 is closed and closed when the switch 105 is open. The shiftable elements of each group are carried on members 175 by means of which the several switches of each group may be moved to open and closed position. Each group of switches is associated with a pair of operating coils; group 166 having operating coils 119 and 121; group 167 having operating coils 123 and 125; and group 168 having operating coils 127 and 129. The coils 119, 123 and 127 are adapted, when energized, to move their corresponding members 175 upwardly in order to close the control switches 101, 103, and 105 and the operating coils 121, 125, and 129 are adapted, when energized, to move the members 175 downwardly in order to open the control switches 101, 103, and 105. One side of the coils 119, 121, 123, 125, 127, and 129 is connected to the direct current bus 83. The free side of the coil 119 is connected by means of a circuit 183 through the switch 113 to a contact 131 of a thermostat device 133 mounted on the panel 43. The free end of the coil 121 also is connected by means of a circuit 185 through the switch 107 with a second contact 139 of the thermostat device 133.

The thermostat device 133 comprises a blade which shifts into engagement with the contact 131 when a predetermined temperature, as for instance 33° Fahrenheit, or higher, prevails within the compartment 16. The blade 133 also is adapted to engage the contact 139 when a predetermined temperature, as for instance 32° Fahrenheit or lower prevails in the compartment 16. The blade 133 is connected by means of the conductor 135 to the direct-current bus 84 and thus constitutes a switching device controlling the operation of the circuits 183 and 185 and, in turn, controlling the solenoids 119 and 121.

The free side of the coil 123 is connected by means of a circuit 187 through the switch 115 to a contact 143 of a thermostat device 145 mounted on the panel 43. The free end of the coil 125 also is connected by means of a circuit 189 through the switch 109 with a second contact 147 of the thermostat device 145. The thermostat device 145 comprises a blade which shifts into engagement with the contact 143 when a predetermined temperature, as for instance 31° Fahrenheit or higher, prevails within the compartment 16. The blade 145 also is adapted to engage the contact 147 when a predetermined temperature, as for instance 33° Fahrenheit or lower prevails within the compartment 16. The blade 145 is connected by means of the conductor 135 with the direct current bus 84 and thus forms a switching device controlling the operation of the circuits 187 and 189 which in turn control the solenoids 123 and 125.

The free side of the coil 127 is connected by means of a circuit 191 through the switch 117 to a contact 153 of a thermostat device 151 mounted on the panel 43. The free end of the coil 129 also is connected by means of a circuit 193 through the switch 111 with a second contact 149 of the thermostat device 151.

The thermostat device 151 comprises a blade which shifts into engagement with the contact 149 when a predetermined temperature, as for instance 29° Fahrenheit or higher, prevails within the compartment 16. The blade 151 also is adapted to engage the contact 153 when a predetermined temperature, as for instance 28° Fahrenheit or lower prevails in the compartment 16. The blade 151 is connected by means of the conductor 135 with the direct current power bus 84 and thus forms a switching device controlling the operation of the circuits 191 and 193 which in turn control the solenoids 127 and 129. The switches 101, 103, and 105 control respectively the operating circuits 159, 157, and 161 extending respectively from the power bus 83 through the switches 101, 103, and 105 through the operating solenoids of the valves 25, 28, and 240.

The circuit 161, which is connected with the operating solenoid of the valve 240, is also connected with the shutter-operating solenoids 32. The return sides of the operating solenoids are connected with the direct current bus 84 by means of the return conductors 155.

*Operation*

When the temperature within the compartment 16 is between 29° Fahrenheit and 30° Fahrenheit, both the heating and cooling apparatus will be inoperative. The blade 145 will be in engagement with the contact 147, the blade 133 will be in engagement with the contact 139 and the blade 151 will be in engagement with the contact 149. The engagement of the blades 145, 133, and 151 with the contacts 147, 137, and 149 will have caused completion of operating circuits from the direct current bus 84 through the conductor 135 to the blades 145, 133, and 151 and thence in parallel respectively through the switches 109, 107, and 111 to cause operation of the coils 125, 121, and 129, which, in turn, will have caused the opening of the switches 103, 101 and 105.

As has heretofore been pointed out, the opening of these switches 103, 101, and 105 results in the opening of the circuits energizing the operating solenoids of the valves 25, 28, and 240 and the shutter-operating solenoids 32. As soon as the switches 103, 101 and 105 open, the switches 107, 109, and 111 also open so that the contacts of the blades 133, 145, and 151 with the contacts 139, 147 and 149 will not continue to draw electrical power from the buses since the circuits are all open at the switches 107, 109, and 111.

If the temperature within the compartment 16 rises above a predetermined temperature, for instance 30° Fahrenheit, the blade 145 will first disengage the contact 147, and at a temperature of for instance 31° Fahrenheit, will engage the contact 143 thus completing a circuit from the direct current bus 84, through the switch 115, which is closed, to the operating solenoid 123 and thence to the direct current bus 83 for the purpose of energizing the solenoid 123. When the solenoid is energized, the switch 103 and the switch 109 close and switch 115 opens thus breaking the operating circuit established by the engagement of the blade 145 with the contact 143. As soon as the switch 103 is closed, a circuit 157, leading from the direct current bus 83 through the switch 103 and the operating solenoid of the valve 25 thence through the return conductor 155 to the direct current bus 84, will be completed for the purpose of energizing the operating solenoid of the valve 28. The valve 28 will thus be shifted to direct the refrigerating medium through the coils of the condenser 17 thence through the valve 25 to the cold storage holdover device 21, the operating solenoid of the valve 25 being inactive at this instant. If the refrigeration thus provided by the cold storage holdover device is sufficient to maintain the temperature of the compartment 16 below 33° Fahrenheit, the system will continue to function indefinitely. If the temperature within the compartment 16 falls to 30° Fahrenheit, the switch blade 145 will engage the contact 147, completing an operating circuit from the direct current bus through the switch 109 and the solenoid 125 to the bus 83, to open the switch 103 and break the circuit 157 thus de-energizing the operating solenoid of the valve 28 and permitting it to return to its normal position circulating the refrigerating medium directly from the pressure side of the compressor through the by-pass conduit 97 to the intake side. If, however, the temperature continues to rise above 31° Fahrenheit, the switch blade 133 will release the contact 139 when a temperature of 32° Fahrenheit is reached and will engage the contact 131 when a temperature of 33° Fahrenheit is reached. The engagement of the blade 133 with the contact 131 completes an operating circuit from the direct current bus 84 through the switch 113, which is closed, to the operating solenoid 119 and thence to the direct current bus 83 for the purpose of energizing the solenoid 119. When the solenoid is energized, the switches 101 and 107 close and the switch 113 opens thus breaking the operating circuit completed by the engagement of the blade 133 with the contact 131. As soon as the switch 101 closes, a circuit 159, leading from the direct current bus 83 through the switch 101 and the operating solenoid of the valve 25 thence through the return conductor 155 to the direct current bus 84, will be completed for the purpose of energizing the operating solenoid of the valve 25. The valve 25 will thus be shifted to direct the refrigerating medium being delivered to the valve 25 through the coils of the condenser 17 to the direct cooling coils 19. The full capacity of the refrigerating system will thus be delivered to the direct cooling coils and directly applied to refrigerate the atmosphere of the compartment. If the temperature within the compartment falls below 32° Fahrenheit under the influence of the direct application of the full capacity of the refrigerating system, the blade 133 will engage the contact 139 completing an operating circuit from the direct current bus 84 through the switch 107, which is closed, and the solenoid 121 to the direct current bus 83 to open the switch 101 and break the circuit 59 thus de-energizing the operating solenoid of the valve 25 and permitting it to return to its normal position to deliver the refrigerating medium to the holdover device. If the temperature within the compartment continues to fall under the influence of the refrigeration provided by the hold-over device, the blade 145 will release the contact 143 and engage the contact 147 thus disconnecting the hold-over devices from operation as heretofore described. If the temperature within the compartment continues to fall after the discontinuation of the hold-over devices from operation, the blade 151, at a temperature of for instance 29° Fahrenheit will release the contact 149 and at a temperature of for instance 28° Fahrenheit will engage the contact 153 thus completing an operating circuit from the direct current bus 84 through the switch 117, which is closed, and the solenoid 127 to the bus 83 thus energizing the solenoid 127 and closing the switches 105 and 111 and opening the switch 117 thus breaking the operating circuit established when the blade 151 engages the contact 153. As soon as the switch 105 closes, a circuit 161, leading from the direct current bus 83 through the switch 105 thence in parallel through the operating solenoid of the valve 240 and the shutter operated solenoids 32, returning to the bus 84 through the return conductors 155, is completed for the purpose of energizing the operating solenoids of the valve 240 and the shutters 34 and thus to place the heating system in operation.

If the temperature within the compartment rises above for instance 28° Fahrenheit, the blade 151 disengages the contact 153 and at a temperature of for instance 29° Fahrenheit, engages the contact 149 thus completing an operating circuit from the direct current bus 84 through the switch 111 which is open and the solenoid 129 to the bus 83 for the purpose of energizing the solenoid 129. The solenoid 129, when energized, opens the switch 105 and the switch 111 thus breaking the operating circuit completed by engagement of the blade 151 with the contact 149 and closes the switch 117. As soon as the switch 105 is opened, the operating circuit 161, through the operating solenoids of the valve 240 and shutters 34, is broken and the operation of the heating system is discontinued.

The pressure limit switch 27 is used for the purpose of relieving the refrigerant circulating system from the dangerously high pressures which are sometimes developed at the discharge side of the compressor 15. It is possible, of course, to build the compressor in such a way as to automatically take care of excess pressures. However, I have shown a switch 27 arranged in the circuits controlling the operating solenoids of the valves 25, 28, and 240A so as to de-energize the operating solenoids of said valves and place the refrigerant circulating system in by-pass condition whenever the pressure at the discharge of the compressor becomes excessive. The switch 27 operates in response to the pressure prevailing at the discharge line of the compressor and has an electrical switch arranged in the return circuit 155 of the operating solenoids of the valves 25, 28 and 240A.

It is, of course, within the contemplation of my invention to arrange the pressure relief switch 27 only in the circuit 157 controlling the operating solenoid of the valve 28, in the embodiment shown in Figures 3 and 4; and in the circuits 157 and 161 controlling the operating solenoids of the valves 28 and 240A, in the embodiment illustrated in Figure 5, in order to condition the refrigerating system to by-pass the refrigerating medium when excessive pressures are developed by the compressor 15. It is, however, simpler to provide for pressure control by placing the switch 27 in the return conductor 155.

It is thought that the invention and numerous of its attendant advantages will be understood from the foregoing description and it is obvious that numerous changes may be made in the form, construction, and arrangement of the several parts without departing from the spirit or scope of my invention or sacrificing any of its attendant advantages; the form herein described being a preferred embodiment for the purpose of illustrating my invention.

Having thus described my invention, what I claim as new and desire to secure by Letters Patent is as follows:

1. In a temperature control system for a vehicle compartment, the combination of a refrigerating system for said compartment including a compressor and cooling coils, means forming a fluid pressure operated driving system for driving the compressor from a moving part of the vehicle, and means forming a closed system including conduit means disposed in said compartment and affording a passage of restricted character through which fluid from said driving system is adapted to be forced under pressure for heating said compartment.

2. In a temperature control system for a vehicle, the combination of means forming a compartment, of power-operated cooling means for the compartment, a fluid pressure-operated motor drivingly connected to said power-operated cooling means, a fluid pressure pump, means connecting said pump and motor in a circulating system whereby the motor may be driven by fluid under pressure from said pump, heating means for said compartment, means actuated by the fluid under pressure in said circulating system between the pump and motor for actuating the heating means to heat the compartment, means to drive said motor, as a fluid pressure generator, to circulate fluid under pressure in the circulating system when the pump is idle without disconnecting the pump from the system.

3. In a temperature control system, the combination, with means forming a compartment, of power-operated cooling means for the compartment, a fluid pressure-operated motor drivingly connected to said power-operated cooling means, a fluid pressure pump, means connecting said pump and motor in a circulating system whereby the motor may be driven by fluid under pressure from said pump, heating means for said compartment including a conduit, means to deliver fluid under pressure from said circulating system to the conduit whereby to utilize the flow of fluid under pressure in said conduit for heating the compartment, means to drive said motor as a fluid pressure generator to deliver fluid under pressure in the circulating system, said system including means whereby the fluid forced into said system by the motor when so operated may by-pass the fluid pressure pump when the same is stationary.

4. In an air-conditioning system for a vehicle, the combination of a compartment, channeled heating means in said compartment, a fluid pressure pump and motor connected in series, means for driving the pump from a turnable part of the vehicle for actuating the fluid motor, and means actuated from an external power source when the vehicle is stationary for operating the fluid pressure motor as a fluid pressure generator, fluid connections forming a closed circuit from the fluid pump to the heating means, and connections from the motor to the heating means whereby to actuate the same either from the fluid pressure generator when the vehicle is moving or from the fluid pressure motor when the system is operated from an external power source.

5. In a temperature control system for a vehicle compartment, individual fluid-pressure operating means for adding heat to or subtracting heat from the compartment, fluid-pressure generating means for operating the heat-subtracting means, and power-operated control means responsive to the temperature within the compartment for selectively controlling the operation of the heat-adding and heat-subtracting means, and means to power the fluid-pressure generating means and the control means selectively from a moving part of the vehicle when in transit and from an external power source when the vehicle is stationary.

6. In an air conditioning system for a vehicle, means forming a compartment in said vehicle, a power-operated temperature conditioning system for said compartment comprising a cooling device disposed in heat exchange relationship with the atmosphere in said compartment, fluid-forcing means and heating means comprising a channelled element having a restricted channel located in heat-exchange relationship with the atmosphere in said compartment, means for actuating the conditioning system including means operable selectively to deliver a refrigerating medium in said cooling device and to connect said fluid-forcing means to the channelled element whereby to force fluid under pressure through the channel thereof for the purpose of heating the compartment.

7. In an air conditioning system for a vehicle, means forming a compartment in said vehicle, a power operated temperature conditioning system for said compartment comprising a refrigerator including a cooling element disposed in heat exchange relationship with the atmosphere in said compartment, means to actuate said refrigerator comprising an hydraulic drive including fluid pressure generating means, heating means comprising a channeled element located in heat exchange relationship with the atmosphere in said compartment, and means operable selectively to deliver a refrigerating medium to said cooling element and to connect the fluid forcing means of said hydraulic drive to the channeled element whereby to force fluid under pressure through the channel thereof for the purpose of heating the compartment.

8. The combination, with an enclosed space, of a heating unit having a restricted passageway to cause liquid forced therethrough to generate heat in said unit to heat said space, a pump for supplying liquid to said unit, means for driving said pump, and temperature controlled means for controlling the delivery of liquid to said unit.

9. The combination with an enclosed space, of air conditioning apparatus to cool said space, a hydraulic motor for driving said apparatus, a heating coil arranged within said space to cause liquid forced therethrough to heat said space, a pump for delivering liquid to said motor, and, selectively, to said coil, and means for driving said pump.

10. The combination with an enclosed space, of air conditioning apparatus to cool said space, a hydraulic motor for driving said apparatus, a heating coil arranged within said space to cause liquid forced therethrough to heat said space, a pump for delivering liquid to said motor and said coils, control means operable to prevent delivery of liquid to said coils at desired intervals, and means for driving said pump.

11. The combination, with a vehicle, of air conditioning apparatus to cool the interior of said vehicle, a hydraulic motor for driving said apparatus, a heating coil arranged within said vehicle to cause liquid forced therethrough to heat the interior of said vehicle, and a pump driven by motion imparted thereto from said vehicle for delivering liquid to said motor and, at intervals, to said coil.

12. The combination, with a vehicle, of air conditioning apparatus to cool the interior of said vehicle, a hydraulic motor for driving said apparatus, a heating coil arranged within said vehicle to cause liquid forced therethrough to heat the interior of said vehicle, and a pump driven by motion imparted thereto from said vehicle for delivering liquid to said motor, and thermo-responsive means for controlling the flow of liquid to said coil.

13. The combination, with a wheeled vehicle, of air conditioning apparatus carried by said vehicle to cool the interior thereof, a hydraulic motor for driving said apparatus, a heating coil carried by said vehicle to cause liquid forced therethrough to heat the interior of said vehicle, a pump for delivering liquid to said motor and selectively to said coil, and a drive connecting said pump to a wheel of said vehicle to drive said pump from said wheel.

14. The combination, with a wheeled vehicle, of air conditioning apparatus carried by said vehicle to cool the interior thereof, a hydraulic motor for driving said apparatus, a heating coil carried by said vehicle to cause liquid forced therethrough to heat the interior of said vehicle, a pump for delivering liquid to said motor and selectively to said coil, a drive connecting said pump to a wheel of said vehicle to drive said pump from said wheel, and means for directing the output of said pump in a given direction irrespective of the direction of wheel rotation.

15. The combination, with a vehicle and air-conditioning apparatus carried by said vehicle for cooling the interior thereof, a hydraulic motor for driving said apparatus, a heating coil carried by said vehicle to cause liquid forced therethrough to heat the interior of said vehicle, a pump driven by motion imparted thereto from said vehicle for delivering liquid to said motor and, selectively, to said coil, an electric motor for driving said apparatus, and means for connecting said motor into a stationary electric circuit when said vehicle is stationary.

16. The combination, with a vehicle and air conditioning apparatus carried by said vehicle for cooling the interior thereof, a hydraulic motor for driving said apparatus, a heating coil carried by said vehicle to cause liquid forced therethrough to heat the interior of said vehicle, a pump driven by motion imparted thereto from said vehicle for delivering liquid to said motor and, selectively, to said coil, an electric motor for driving said hydraulic motor to cause it to function as a pump, means for connecting said motor into a stationary electric circuit when said vehicle is stationary, and fluid connections for enabling said hydraulic motor to circulate liquid through said coil upon being driven by said electric motor.

17. The combination, with a vehicle and air-conditioning apparatus carried by said vehicle for cooling the interior thereof, a hydraulic motor for driving said apparatus, a heating coil carried by said vehicle to cause liquid forced therethrough to heat the interior of said vehicle, a pump driven by motion imparted thereto from said vehicle for delivering liquid to said motor and, selectively, to said coil, an electric motor for driving said hydraulic motor to cause it to function as a pump, means for connecting said motor into a stationary electric circuit when said vehicle is stationary, fluid connections for enabling said hydraulic motor to circulate liquid through said coil upon being driven by said electric motor, means for diverting from said coil the liquid circulated by said hydraulic motor, and means for connecting said electric motor to said apparatus to drive the same.

18. The combination, with a wheeled vehicle, of cooling apparatus carried by said vehicle to cool a compartment thereof, an hydraulic motor for driving said apparatus, a fluid pressure generator, means to drive said generator in response to the motion of the vehicle when in transit, heating means carried by said vehicle in position to heat said compartment, selectively operable means to apply the energy developed in an hydraulic medium by said fluid pressure generator to actuate said heater, and to connect said generator with said hydraulic motor whereby to drive the same and said cooling apparatus when the vehicle is in transit.

19. The combination, with a wheeled vehicle, of cooling apparatus carried by said vehicle to cool a compartment thereof, an hydraulic motor for driving said apparatus, a fluid pressure generator, means to drive said generator in response to the motion of the vehicle when in transit, heating means carried by said vehicle in position to heat said compartment, selectively operable means to apply the energy developed in an hydraulic medium by said fluid pressure generator to actuate said heater, and to connect said generator with said hydraulic motor whereby to drive the same and said cooling apparatus when the vehicle is in transit, and electromotive means for driving the cooling apparatus, and for driving said hydraulic motor as a fluid pressure generator when the vehicle is stationary.

WILLIAM W. WISHART.